UNITED STATES PATENT OFFICE.

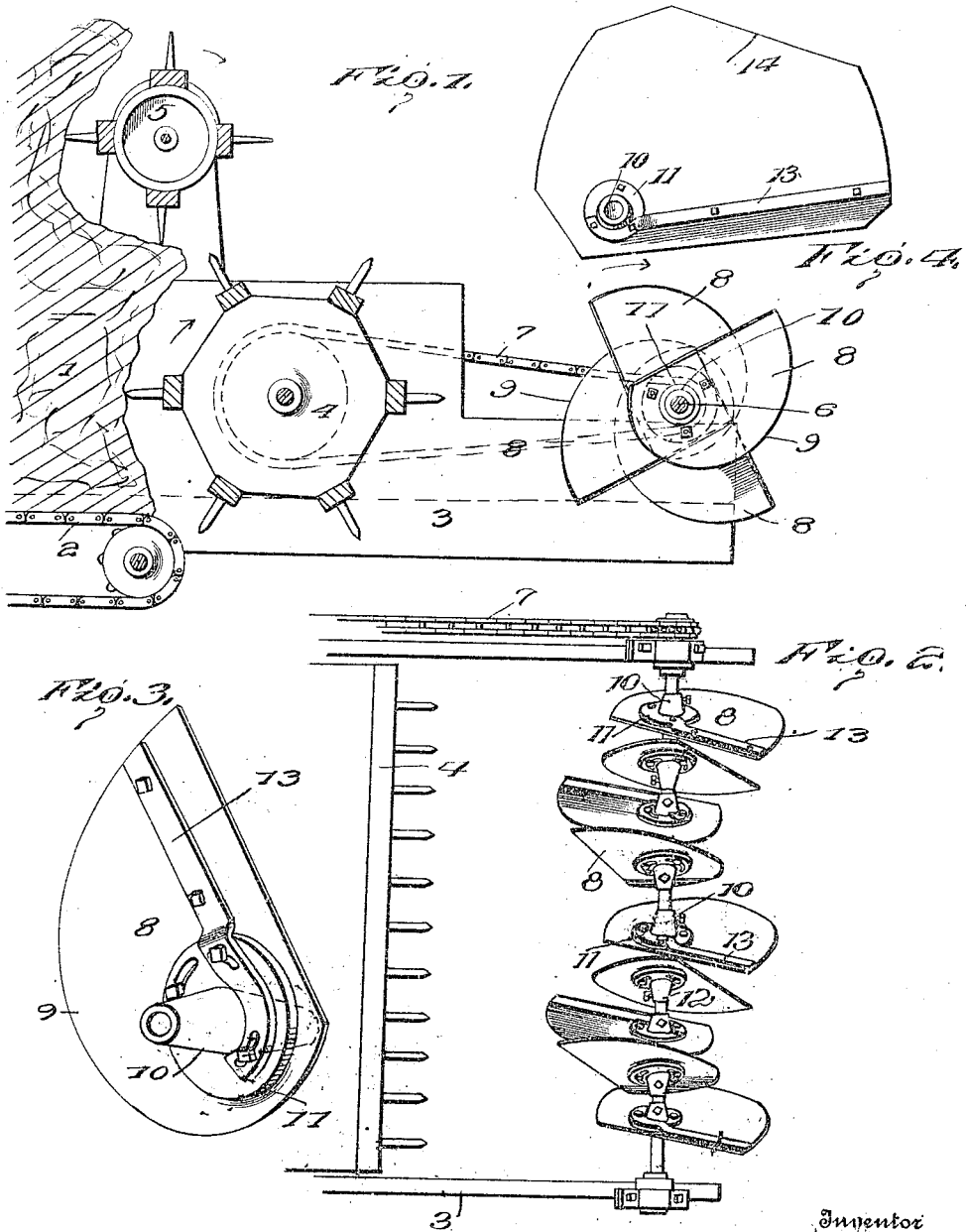

HENRY SYNCK, OF COLDWATER, OHIO, ASSIGNOR TO NEW IDEA SPREADER COMPANY, OF COLDWATER, OHIO.

SPREADER ATTACHMENT FOR FERTILIZER-DISTRIBUTERS.

1,213,554.  Specification of Letters Patent.  Patented Jan. 23, 1917.

Application filed September 10, 1914. Serial No. 861,022.

*To all whom it may concern:*

Be it known that I, HENRY SYNCK, citizen of the United States, residing at Coldwater, in the county of Mercer and State of Ohio, have invented certain new and useful Improvements in Spreader Attachments for Fertilizer-Distributers, of which the following is a specification.

This invention relates to manure spreaders or fertilizer distributers and has special reference to mechanism for repulverizing and spreading the material broadcast over a wide area during a single trip of a vehicle having a relatively narrow body.

My present invention is an improvement on the mechanism shown in Patent No. 648,519, granted to Joseph Oppenheim May 1, 1910, and consisting of a spreading attachment disposed in rear of the pulverizing mechanism and embodying a plurality of paddles or blades each set obliquely upon the shaft carrying them. The blades or paddles in this patented device were of rectangular form and the front edges of the same were straight and practically at a right angle to the material engaged thereby. As this material generally consisted of animal excreta mixed with straw or similar bedding material, there was a tendency of the long strawy or hairy elements of the mixture to catch on and cling to the forward edge of a blade or paddle so that the lateral spreading would, at times, be impaired or prevented, the material, when finally thrown from the blade, dropping to the ground in a straight line.

One object of my present invention is to provide a wide-spreading attachment for fertilizer-distributers by which this objectionable clinging of the long material will be overcome so that this material also will be distributed and a wider swath covered on each trip of the vehicle than was heretofore possible.

Other objects of the invention are to avoid the lateral flight of the material being arrested by the blades, and to provide a blade mount which will permit the obliquity of the blade to be varied.

The several stated objects and other incidental objects are attained in the mechanism illustrated in the annexed drawings, in which—

Figure 5:
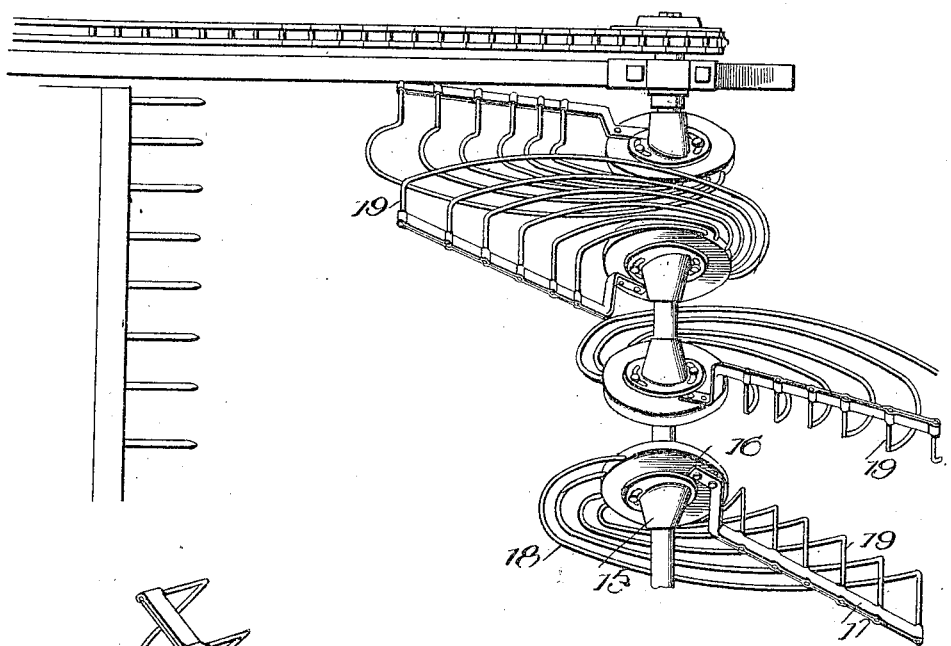
Figure 6:
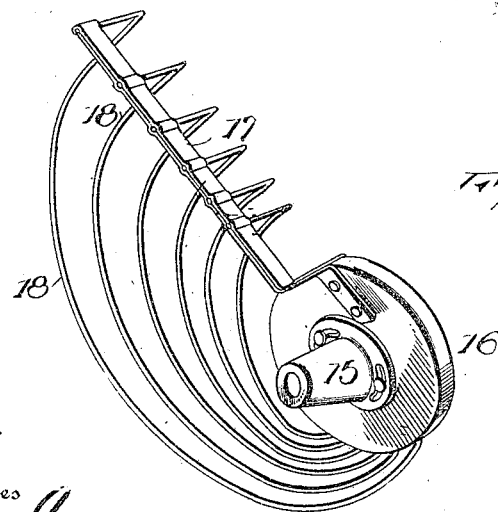

Figure 1 is an end view of my improved spreader in operative position. Fig. 2 is a plan view of the same. Fig. 3 is a detail perspective view of a single blade, paddle or deflector. Fig. 4 shows a modification. Fig. 5 is a plan view showing a further modification. Fig. 6 is a perspective view of one of the blades or deflectors shown in Fig. 5.

My improvement, which I will briefly call a spreader, may be applied to any form of fertilizer-distributer capable of discharging manure or fertilizing material onto its blades.

I have illustrated a portion of a fertilizer distributer in which the fertilizer, indicated at 1, is carried by a feeding apron 2 toward the rear end of a wagon body 3 where it is taken up, pulverized and distributed or thrown rearward by a lower beater or pulverizing and distributing cylinder 4 and an upper beater or pulverizing and distributing cylinder 5 set somewhat in advance of the lower beater, the beaters rotating in the same direction, as indicated by the arrows. These beaters or cylinders break up the compact masses of material and throw the same rearward in a more or less pulverized or disintegrated condition.

Mounted upon the rear end of the wagon body 3, or upon arms extending therefrom, is a spreader shaft 6 which is preferably rotated in the same direction as the beaters through any preferred mechanism, although the spreader can rotate in either direction by reversing the blades or shaft, provided the working edge is forward. A convenient arrangement, when the spreader runs in the same direction as the beaters, is to drive the spreader by chain and sprocket gearing from the lower beater as indicated at 7, the beaters being usually driven from the ground wheels of the vehicle. Upon the shaft 6, I secure a plurality of deflectors, blades or paddles 8 which are disposed obliquely on the shaft, as shown clearly in Fig. 2, the shaft passing through each blade near one end thereof. The forward or material-engaging edge 9 of the blade is eccentric to the shaft and describes a curve on the order of a spiral or involute curve, which extends across the outer end of the blade or that end more remote from the spreader shaft. The blades may be secured to the shaft in any desired manner and I prefer to employ a hub 10 having a circumferential rib or flange 11 which is bolted or otherwise rigidly secured to a face of the blade, said rib being in angular relation to the body of the hub so that the blade secured thereto will be given the desired obliquity upon the shaft. The hubs may be secured to the shaft by set screws 12 and they may be of such length that the ends of adjacent hubs abut and thereby maintain the blades in their spaced relation along the shaft. A reinforcing strip 13 may be secured to one face of the blade adjacent the rear edge thereof to prevent buckling of the blade, as will be readily understood.

In Fig. 4, I show a blade in which a portion of the working edge is a straight line 14, which extends obliquely toward the back edge and the outer end of the blade. It will be readily seen that in this form, as well as in the form shown in the other figures, the working edge is eccentric to the spreader shaft and, instead of the entire working edge engaging the material at the same instant, the point of engagement is initially near the hub or center of rotation of the blade and progresses toward the outer end of the blade as the same swings upward.

In Figs. 5 and 6, 15 designates the hubs which are secured to the spreader shaft and 16 designates flanges or disks upon the several hubs, the flanges or disks being concentric with the hubs but disposed obliquely thereon. Secured to and projecting from the disk or flange is a supporting or brace bar 17 to which are secured the outer ends of curved rods 18, the inner ends of which are secured to the disk. It will be noted that the inner ends of these rods are close together and that the rods diverge toward their outer ends which are spaced apart an appreciable distance. Each rod forms an eccentric curve following a spiral path, the radius of which increases as it recedes from the shaft. While this construction does not provide a solid blade it furnishes a very satisfactory deflector. The outer extremities of the rods are bent laterally, as at 19, so that the support or brace 17 will be carried to one side of the plane of obliquity of the blade and will be behind the blade as the same meets the material. I thus avoid the retention of the long elements of the material upon the brace. While this brace is advantageous in keeping the outer ends of the rods in position, it is not essential and may be omitted.

The blades may, of course, be set at any desired angle to the shaft and at any desired distance apart annularly. They may also be fastened rotatably adjustable to the oblique circumferential rib 11, as will be understood upon reference to Figs. 3 and 6, so as to have different positions of angle or obliqueness. I prefer to arrange one-half the blades with their working faces inclined toward one side of the machine and the other half of the blades inclined toward the opposite side of the machine so that the material will be thrown to both sides equally. I also prefer to arrange the blades so that each blade will be about ninety degrees behind the adjacent blade immediately preceding it in operation as this arrangement provides clearance for the laterally moving material so that one paddle will not merely throw the material upon the one adjacent and thereby stop the lateral movement of the material.

The spreader is preferably rotated at a higher speed than that of the beaters and is so arranged that the material thrown out by the beaters will come in the path of the spreader paddles and be deflected laterally. It will be readily noted that my improved blade is substantially triangular and its working edge is a line or curve having a progressively increasing radius as it recedes from the center of rotation of the blade. This edge, consequently, does not engage the fertilizer abruptly but meets the same gradually so that the long strawy material which would ordinarily tend to cling to the blade and wind around the spreader, will ride upward along the curved or involute edge and, together with that coming in contact with the obliquely disposed sides of the blades, be thrown away. Moreover, this long material will travel toward the outer end of the blade where the greatest centrifugal force is exerted and will be thrown the maximum distance. A spreader using my improved obliquely disposed blades spaced apart both along and around the shaft, will consequently also act laterally on the material coming in contact with the forward working edge, and experiments have demonstrated that a wider swath is covered than heretofore.

By spacing the blades annularly as indicated, adjacent blades engage the material successively instead of simultaneously so that each blade will act in advance of the neighboring blade and will retire from the zone of action before the said neighboring blade becomes a working blade. There is a clear lateral space at the sides of each blade, therefore, through which the deflected material will be thrown instead of being merely cast upon the adjacent blade. It will, of course, be noted that the sides of the blade are plane or flat-faced and the plane or flat-faced side strikes the material and deflects it laterally so that it will be spread broadcast.

Having thus described the invention, what I claim and desire to secure by Letters Patent is:—

1. In a broadcast spreader for fertilizer distributers, the combination with means for feeding material, of a spreader disposed in the path of the material from the feeding means and including a rotary member, and blades mounted on the rotary member at an oblique angle to the axis of rotation of said member, each blade having an edge formed on a line of gradually increasing radius toward its outer end and upon which the material will ride, said blades being movable against the line of feed of the material.

2. In a broadcast spreader for fertilizer distributers, the combination with means for feeding material, of a spreader disposed in the path of the material from the feeding means and including a rotary member, and blades secured to rotary member in stepped relation around the circumference thereof and disposed at an oblique angle to the axis of rotation of said member, each blade having an edge formed on a line of gradually increasing radius toward the outer end thereof and upon which the material will ride and from the outer end of which it will be thrown laterally by centrifugal force as the member rotates.

3. In a broadcast spreader for fertilizer distributers, the combination with means for feeding material, of a spreader disposed in the path of the material from the feeding means and including a rotary member, blades secured to the rotary member progressively around the circumference thereof and each having an edge arranged at substantially right angles thereto, and a side face disposed at an oblique angle to the axis of rotation of said member, each blade having a curved edge formed on a line of gradually increasing radius toward the outer end thereof and upon which the material will ride when the member is rotated.

4. A broadcast spreader for fertilizer distributers comprising a rotary member, and blades secured to the rotary member at an oblique angle to the axis of rotation thereof, each blade having an edge formed on a line of gradually increasing radius toward the outer end thereof and upon which the material will ride, the several blades being disposed progressively around the rotary member whereby a clear lateral passage for the material acted upon by the blades is provided at the side of each blade.

5. A broadcast spreader for fertilizer distributers comprising a rotary member, and a blade secured to said member at an oblique angle to the axis of rotation thereof, an edge of said blade being eccentric to the rotary member and describing a substantially involute curve, the radius of which increases as it recedes from said rotary member and upon which edge the material will ride.

6. A spreader blade, fastened to a disk or plate being oblique to the shaft or equivalent to which it is attached or forms a part, and means to fasten this blade in different positions rotatively to said plate.

7. A deflector for manure spreaders comprising a hub, an attaching member disposed obliquely on said hub, and a material-engaging member adjustably secured to said disk.

8. A broadcast spreader for fertilizer distributers comprising a rotary shaft, an attaching member fixed on said shaft obliquely thereto, and a blade secured to said attaching member and projecting outwardly therefrom and adjustable thereon around the shaft whereby the obliquity of the blade relative to the shaft may be varied.

In testimony whereof I affix my signature in presence of two witnesses.

HENRY SYNCK. [L. S.]

Witnesses:
 AL. MUELLER,
 D. WM. FRICK.